Oct. 27, 1936.  B. E. TIFFANY  2,058,924
REFRIGERATING MEDIUM
Filed Sept. 28, 1934
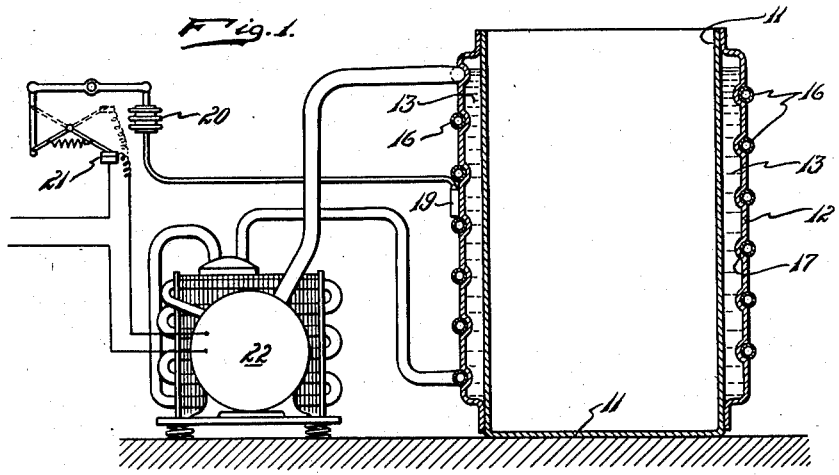
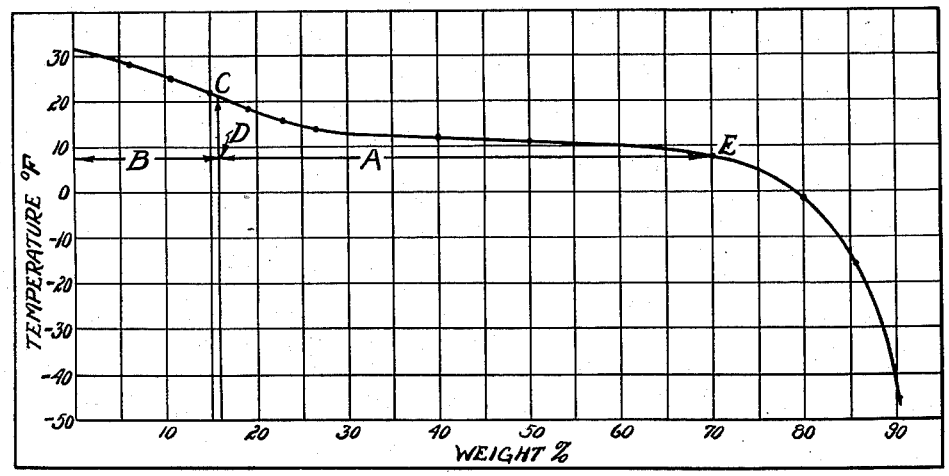
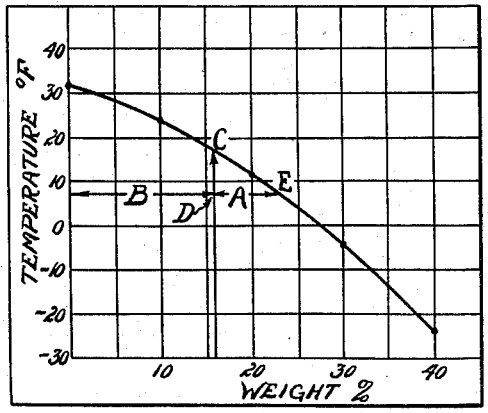
INVENTOR.
BURTON E. TIFFANY
BY Warren H. F. Schmieding
ATTORNEY.

Patented Oct. 27, 1936

2,058,924

UNITED STATES PATENT OFFICE 2,058,924

REFRIGERATING MEDIUM

Burton E. Tiffany, Detroit, Mich., assignor to Kelvinator Corporation, Detroit, Mich., a corporation of Michigan Application September 28, 1934, Serial No. 745,951

2 Claims. (Cl. 252—5)

My invention pertains to a refrigerating medium and more particularly to a hold-over brine solution useful for storing and/or transferring heat in refrigerating systems.

It is an object of my invention to provide a hold-over brine solution for refrigerating apparatus comprising a propyl alcohol in water in which a large percentage of ice is separated out in a narrow temperature range.

Another object of my invention is to provide a hold-over brine solution for refrigerating apparatus comprising normal propyl alcohol in water such that the heat content varies only slightly during the normal operation of the refrigerating system and a large refrigerating capacity is available at a temperature slightly above the normal operating temperature to provide for emergencies when the refrigerating apparatus is shut off.

A further object of my invention is to provide a hold-over brine solution which will not freeze solidly and burst the refrigerating apparatus in which it is confined.

It is also an object of my invention to provide a non-congealing heat storing brine comprising a solution of normal propyl alcohol in water which is especially suitable and efficient for use in refrigerating apparatus, and which may be made non-corrosive for use in vessels of steel and other corrodible materials by the addition of a small quantity of potassium chromate or sodium chromate.

My refrigerating hold-over brine, however, both as to its preparation, characteristics, and use together with additional objects and advantages thereof, will best be understood from the following description, taken in conjunction with the accompanying drawing, in which:

Fig. 1 is a sectional view showing refrigerating apparatus of a type in which my hold-over brine may be advantageously utilized; and Figs. 2 and 3 are curves illustrating the improved characteristics of my hold-over solution.

Referring more particularly to Fig. 1 of the drawing, the apparatus shown comprises a sheet metal receptacle 11 of cylindrical or rectangular formation suitable for providing storage compartments in cabinets such as ice cream cabinets for example. A sheet metal sleeve 12 is provided in spaced relation around the receptacle 11, and its upper and lower edges are rigidly secured thereto in any suitable manner as by welding. A chamber 13 is thus provided substantially coextensive with the outer surface of the food storage receptacle 11 for enclosing a brine in good thermal contact therewith. A refrigerant receiving conduit 16 is coiled helically around the chamber enclosing sleeve 12 which may be provided with a spiral groove 17 to receive and support the conduit 16 in close coupled thermal relation therewith.

To cool the receptacle a refrigerant is circulated from any suitable source through the conduit 16 which is coiled about the brine chamber 13 in which a suitable heat transferring and storing medium is provided for transmitting the heat from the food storage compartment to the cooling coils. The admission of refrigerant to the cooling coils is usually controlled intermittently to maintain the desired temperature range in the receptacle as by a thermostatic device so disposed that it is influenced by the temperature within either the brine chamber or the food storage receptacle. The thermal control may consist of a conventional thermostatic device comprising a thermo-bulb 19 disposed adjacent the brine chamber or the storage compartment and connected to an expansible bellows 20 which actuates a snap switch 21 for starting and stopping a motor compressor unit 22. When the motor compressor unit 22 operates it withdraws refrigerant vapor from the coils, compresses and condenses it, and returns the liquefied refrigerant thereto.

The temperatures maintained by the intermittent operation of such refrigerating apparatus normally pulsates intermittently between predetermined limits depending upon the adjustment of the thermal control device.

It has been customary to use various brine solutions for the heat transferring medium in enclosed chamber, such as 13, where it serves the very important function of providing a reserve hold-over capacity. However the solutions previously provided for this purpose have caused considerable difficulty because a large portion of the brine melted and was frozen again during each cycle of intermittent operation of the refrigerating apparatus, and because the particles freezing out of solution thereby changed the concentration and caused the freezing temperatures of the mixture to vary through a wide range whereby they could not be relied upon to maintain predetermined temperatures within the food storage receptacle, nor to maintain the temperature uniformly on different portions of the chamber wall.

In accordance with my invention I provide for use in such apparatus a heat transferring and hold over brine which has greatly improved operating characteristics. My improved hold-over brine comprises a solution of a propyl alcohol in water. For this purpose I prefer to use normal propyl alcohol, and the proportions of this ingredient to be used with the water depends upon the range of temperatures and other operating characteristics of the refrigerating apparatus with which the solution is to be used. If the walls of the chamber are of some corrodible material, such as steel, I find it advantageous to also provide a small quantity of an anticorrosion agent such as potassium chromate or sodium chromate sufficient to prevent corrosion, but this is of course unnecessary when the vessel is made of sheet copper or other noncorrodible material.

The proportions of the ingredients of the solution may be varied to adjust the characteristics in accordance with the conditions of use, but I have found that a greatly improved refrigerant hold-over brine may be prepared which is suitable for use in the average refrigerated ice cream cabinet by providing a solution of from seventeen (17) to twenty-five (25) per centum by weight of normal propyl alcohol in water.

If the apparatus in which the solution is to be used is of steel or other corrodible material the corrosion may be prevented by adding about one tenth ($\frac{1}{10}$) to two tenths ($\frac{2}{10}$) of one percentum of potassium chromate or sodium chromate.

My refrigerant hold-over brine separates out a high percentage of ice between 10 and 15 degrees Fahrenheit with only a slight increase in the quantity of ice separated as the temperature falls below five degrees Fahrenheit. The result is that the brine changes heat content only slightly during the normal intermittent cycling of the machine. Also the efficiency of the system is thus greatly improved. However, in cases of emergency conditions stopping the compressor unit or interrupting the supply of refrigerant to the cooling coils for any reason, there is a large refrigerating capacity available at only a few degrees above the normal cabinet temperature. This provides a good food preserving temperature for a longer period of time than prior brines and diminishes the waste and loss caused by emergencies. Another very desirable characteristic of my hold-over brine is that it will not solidify above sixty (60) degrees below zero Fahrenheit, and there is no danger that it will freeze solid and injure the refrigerating apparatus.

The unusually desirable characteristics of the refrigerant hold-over brine of my invention are clearly shown by Fig. 2, which is a freezing point curve showing how the freezing point of a solution of normal propyl alcohol in water varies from 32 degrees above zero Fahrenheit to 45 degrees below zero as the proportion of this alcohol is varied from zero (0) to ninety (90) per centum. In this curve the ordinates indicate the temperatures at which freezing begins and the abscissæ represent the per centum, by weight, of normal propyl alcohol in the solution. In Fig. 3 a similar freezing point curve is shown for a solution prepared by adding ethanol alcohol to water. By comparing Fig. 3 with Fig. 2 the exceptionally desirable features of my solution are particularly apparent.

If, for example, it is desired to ascertain the temperature at which a seventeen (17) per centum solution of normal propyl alcohol begins to freeze, this is readily accomplished by erecting a vertical line from the point on the abscissæ, in Fig. 2, which represents seventeen (17) per centum. From the point C where the vertical line intersects the curve, a line may be extended horizontally to intersect the ordinate representing temperatures and the intersection point indicates the temperature, which is about 21 degrees Fahrenheit above zero (0). By a similar procedure the temperature at which a seventeen (17) per centum solution of ethanol alcohol will begin to freeze may be ascertained, and this is found to be about seventeen (17) degrees above zero Fahrenheit. However, a more important fact to be ascertained is the percentage of ice which will be separated out at various temperatures below the temperature at which freezing begins. This is also readily ascertainable from the curves shown in Figs. 2 and 3. Selecting a given temperature of eight (8) degrees above zero, for example, a line is extended horizontally from the point on the ordinate axis corresponding to this temperature, and the extended line intersects the vertical line and the curve at points D and E. The portion of the horizontal line between the ordinate axis and the vertical line may be designated as B, and the portion between the vertical line and the curve, or between points D and E, may be designated as A.

The percentage of ice separated out of solution at the selected temperature of eight (8) degrees above zero, is readily calculated from the formula:

$$\text{Percentage ice} = \frac{A}{A+B}$$

For the propyl alcohol solution at this temperature, A is much greater than B, as shown in Fig. 2, whereas for the ethanol alcohol solution, as shown in Fig. 3, B is appreciably greater than A. From this it is apparent that a much higher percentage of ice is separated out of my hold-over brine prepared with normal propyl alcohol, in accordance with my invention, than from a brine prepared with ethanol alcohol. In the example given the figures indicate that approximately 77% ice is separated out from the normal propyl alcohol as compared with about 28 per centum from a brine prepared with ethanol alcohol.

It will be understood that the desirable characteristics of my hold-over brine may in like manner be readily demonstrated, from the curves of Figs. 2 and 3, for various different concentrations and temperatures and that the specific concentration and temperature referred to were selected merely as an illustrative example.

It has been demonstrated that my refrigerant hold-over brine has desirable characteristics such as freezing out a large percentage of ice over a very narrow freezing range, and a solidifying temperature which is so low that there is no danger of the brine freezing solid and bursting the enclosing vessel. As set forth, the freezing temperature range may be so adjusted that most of the ice frozen out remains frozen and the heat content of the mixture varies only slightly during the normal operation of the system whereby a large refrigerating capacity is held in reserve at a temperature only slightly above the normal operating temperatures to take care of emergency conditions. As previously explained, my brine may also be made non-corrosive for use in corrodible apparatus.

I claim as my invention:

1. A refrigerant hold-over brine comprising a 17 to 25 percent solution by weight of normal propyl alcohol in water.

2. A refrigerant hold-over brine comprising a 17 to 25 percent solution by weight of normal propyl alcohol in water with $\frac{1}{10}$ to $\frac{2}{10}$ per centum of an alkali metal chromate therein.

BURTON E. TIFFANY.